United States Patent [19]

Alexander et al.

[11] 4,327,925
[45] May 4, 1982

[54] DISC BRAKE BOOT SEAL METHOD AND ARTICLE

[75] Inventors: Ronald J. Alexander; Dean R. Bainard, both of Gastonia, N.C.

[73] Assignee: Garlock Inc., Longview, Tex.

[21] Appl. No.: 63,751

[22] Filed: Aug. 6, 1979

[51] Int. Cl.³ .................. F16J 15/52; B23P 15/10
[52] U.S. Cl. .................. 277/212 FB; 29/436; 29/451; 92/168; 74/18.2; 264/267; 264/271.1
[58] Field of Search ............... 29/436, 454, 451, 446, 29/450, 148.4 S, 235, 235.5; 92/98 D, 168; 74/18.2, 18.1; 277/212 FB, 200; 264/267, 271, 328.3, 328.1; 188/72.4, 72.5

[56] References Cited

U.S. PATENT DOCUMENTS

| | | | |
|---|---|---|---|
| 2,585,602 | 2/1952 | Turner | 29/450 |
| 2,643,448 | 6/1953 | Piazze | 29/235.5 |
| 3,225,436 | 12/1965 | Talamonti | 29/436 |
| 3,322,445 | 5/1967 | Hassan | 277/212 FB |
| 3,430,995 | 3/1969 | Herbenar et al. | 277/212 FB |
| 3,490,343 | 1/1970 | Afanador et al. | 92/168 |
| 3,535,896 | 10/1970 | Brown et al. | 68/12 R |
| 3,535,942 | 10/1970 | Kateb | 72/18.2 |
| 3,651,896 | 3/1972 | Fannin | 188/72.6 |
| 3,712,422 | 1/1973 | Haraikawa et al. | 188/72.5 |
| 3,801,111 | 4/1974 | Messenger | 277/58 |
| 3,998,466 | 12/1976 | Kondo | 188/72.5 |
| 4,003,666 | 1/1977 | Gaines et al. | 277/212 FB |
| 4,248,329 | 2/1981 | Torigoe | 188/72.4 |

FOREIGN PATENT DOCUMENTS

1491446 7/1967 France .................. 277/212 FB

*Primary Examiner*—Daniel C. Crane
*Attorney, Agent, or Firm*—Schovee & Boston

[57] ABSTRACT

A disc brake boot seal 10 (and method for assembling a disc brake system) that is molded in its extended condition and that when moved into its collapsed condition will remain in its collapsed condition. The boot seal comprises a molded elastomeric sleeve 12 having a plurality of different wall portions 20-34 certain ones of which interact to releasably hold the sleeve in its collapsed condition so that it does not self-extend. The expense and high mold breakage resulting from the prior art system of molding a seal in its collapsed, convoluted condition are eliminated by this invention.

33 Claims, 6 Drawing Figures

DISC BRAKE BOOT SEAL METHOD AND ARTICLE

TECHNICAL FIELD

This invention relates to a flexible, elastomeric disc brake boot seal for sealing the annular space between a piston and cylinder of a disc brake assembly from contamination by dirt and water.

BACKGROUND OF THE PRIOR ART

Disc brake boot seals are known. However, because the boot seal must be in its collapsed condition when the piston of the disc brake system is installed (to provide sufficient room for the piston between the top of the boot seal and the top of the caliper), such known boot seals are presently molded in their collapsed condition. This process is expensive and there is high mold breakage. The seal that is presently used includes a boot or sleeve having a uniformly thin flexible wall molded in an accordion-pleated, bellows, or collapsed condition. During operation, the known boot seal can stretch into an elongated condition. One end of the boot seal is retained in a cylinder bore recess. In the interest of space and weight economy, the piston-to-bore annular space must be kept as narrow as possible. For example, the piston can have an outside diameter of 45 mm and the cylinder recess or bore for retaining the boot can have a 58.3 mm bore diameter. The boot seal must be capable of extending approximately 30 mm and collapsing to an overall height of about 11.5 mm when the piston is retracted to change the brake pads. The resulting narrowness of the annular space between the retaining wall of the bore and the piston makes it very difficult to mold a boot seal of bellows configuration with its accordion-like convolutions having sharp bends. The convolutions are required to permit the conventional boot seal to flex and roll into the annular space upon retracting the piston. The sharp bends in the bellows wall of the prior art boot cause the boot to operate in an uneven, jerky manner during retraction and extension. A conventional type of convoluted boot having a bellows type sleeve is described, for example, in U.S. Pat. No. 3,998,466. It has also been suggested to mold the boot seal in its extended condition, however, such seal does not remain in its collapsed condition, but rather self-extends and thus it must be held in its collapsed condition during assembly of the brake system, and particularly during assembly of the brake piston with the rest of the brake system, see U.S. patent application Ser. No. 875,765, filed Feb. 7th, 1978 by Dean R. Bainard & Martin E. Benjamin, now abandoned.

It is an object of the present invention to provide a disc brake boot seal (and method) that can be molded in its extended condition and then collapsed and that will releasably stay in its collapsed condition without self-extending so that the disc brake system can be more readily and easily assembled, for example, without having to hold the boot seal in its collapsed condition.

It is another object of this invention to overcome the problems in the prior art, such as the expense and high mold breakage inherent in molding the boot seal in its collapsed or convoluted condition.

It is another object of the present invention to provide a collapsible sleeve that can be molded in its extended condition and that has a plurality of walls including certain ones that interact to releasably hold, lock or maintain the sleeve in its collapsed condition.

BRIEF SUMMARY OF THE INVENTION

A disc brake boot seal and a method for assemblying a disc brake system wherein the disc brake boot seal is molded in an extended condition, is installed in the cylinder, and the piston is then installed while the boot seal is in its collapsed, self-retaining, condition (without having to be held in its collapsed condition). The boot seal itself can be installed in either its extended or collapsed condition, however, it is always moved to its collapsed condition prior to installing the piston, so that the piston can clear the top of the seal and the top of the caliper. The boot seal includes means for releasably maintaining the boot seal in its collapsed condition such that it does not self-extend. The boot seal includes an annular, molded, unitary, one-piece, flexible, elastomeric sleeve having the following wall portions serially connected together starting at a piston sealing end thereof:

(1) a sealing bead adapted to elastically fit into an annular recess of a piston;
(2) an upper boot wall;
(3) an upper flex wall;
(4) a stabilizing wall;
(5) an intermediate flex wall;
(6) a tapered frusto-conical upper flex and rolling wall;
(7) a lower flex wall;
(8) a tapered frusto-conical lower flex and rolling wall; and
(9) a sealing end adapted to be connected to a cylinder.

Certain of these wall portions interact when the sleeve is in its collapsed condition to releasably hold, maintain or lock the sleeve in such collapsed condition against self-extension. It is much less expensive to mold a boot or sleeve in its extended condition and the amount of mold breakage is greatly reduced.

BRIEF DESCRIPTION OF THE DRAWINGS

The present invention will be more fully understood by reference to the following detailed description thereof, when read in conjunction with the attached drawings, wherein like reference numerals refer to like elements and wherein.

DETAILED DESCRIPTION OF THE INVENTION

Figure 1:
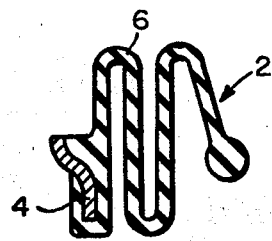
FIG. 1 is an enlarged, partial, cross-sectional view of an as-molded disc brake boot seal of the prior art.

Referring now to the drawings, FIG. 1 shows a prior art disc brake boot seal 2 comprising a metal reinforcing shell 4 and a thin-walled, bellows-type, convoluted, elastomeric sleeve 6 which is molded in its collapsed or convoluted condition. In use, the sleeve 6 moves from its collapsed condition (shown FIG. 1) to its extended condition (not shown), and the elastomer of the bellows remains under tension, when the piston is extended in a disc brake assembly in which the seal 2 is installed.

Figure 2:
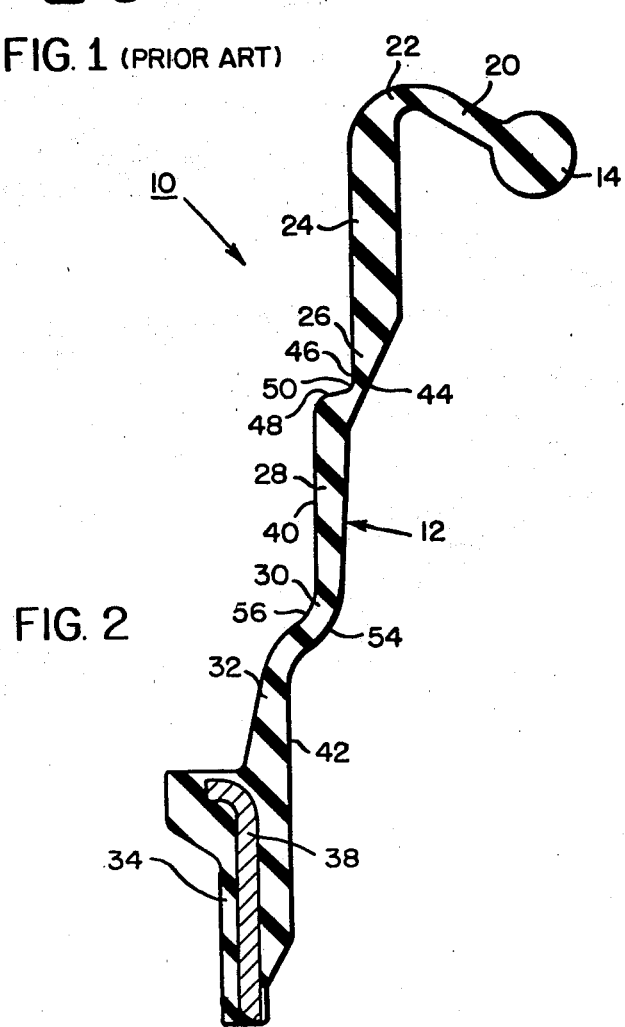
FIG. 2 is an enlarged partial cross-sectional view of an as-molded disc brake boot seal according to the present invention.

The present invention will now be described with reference to FIGS. 2-6. FIG. 2 shows an as-molded disc brake boot seal 10 according to the present invention comprising an annular, molded, unitary one-piece, flexible elastomeric sleeve 12 that is collapsible from its extended condition shown in FIG. 2 to its collapsed condition shown in FIGS. 4 and 5. The sleeve 12 comprises the following wall portions serially connected together starting at a piston sealing end thereof: (a) a sealing bead 14 adapted to elastically fit into an annular recess 16 in a piston 18 (see FIGS. 3 and 4) (b) an upper boot wall 20; (c) an upper flex wall 22; (d) a stabilizing wall 24; (e) an intermediate flex wall 26; (f) a tapered frusto-conical upper flex and rolling wall 28; (g) a lower flex wall 30; (h) a tapered frusto-conical lower flex and rolling wall 32; and (i) a sealing end 34 adapted to be connected to a cylinder 36 (see FIG. 4). The end 34 includes elastomeric material which is bonded to a metal shell 38. The shell 38 is basically a standard shell for use with this type of seal.

Figure 3:
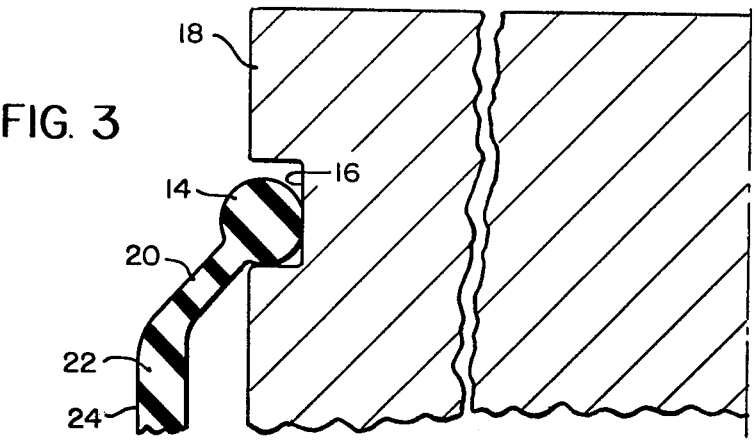
FIG. 3 is an enlarged fragmentary, cross-sectional view of a piston of a disc brake with one end of the boot seal of the present invention in extended position and retained in a recess of the piston.
Figure 4:
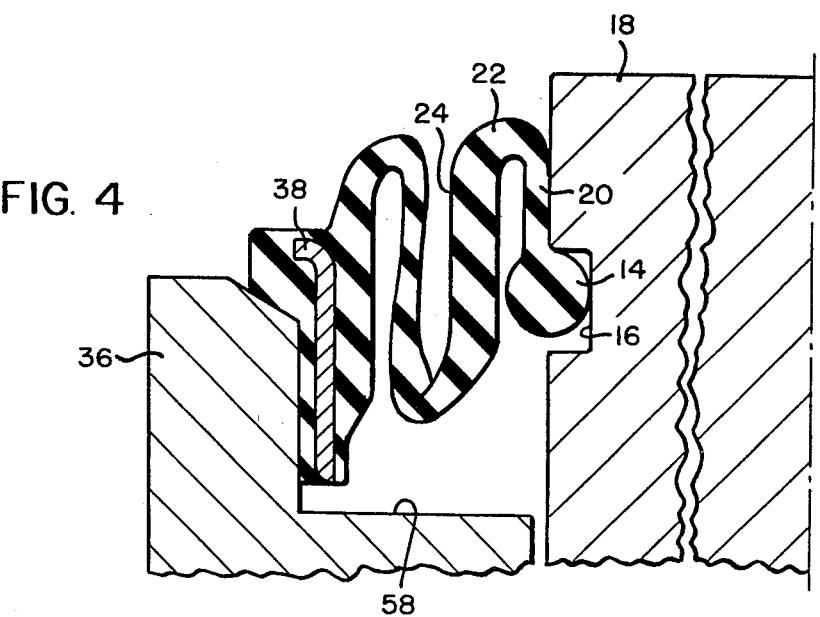
FIG. 4 is an enlarged, partial cross-sectional fragmentary view of a disc brake piston and cylinder and the boot seal of the present invention, showing the boot seal in its collapsed, convoluted, installed condition and the piston in partially retracted position in the cylinder.

The tapered frusto-conical upper flex and rolling wall 28 tapers from a narrower thickness to a greater thickness in the axially outward direction (in FIGS. 2-4 the upper direction is the "axially outward" direction away from the disc brake assembly and the downward direction is the "axially inward" direction). The tapered frusto-conical lower flex and rolling wall 32 tapers from a narrower thickness to a greater thickness in the axially inward direction. The radially outer wall surface 40 of the upper flex and rolling wall 28 is substantially cylindrical as is the radially inner wall surface 42 of the lower flex and rolling wall 32.

The intermediate flex wall 26 has a radially inner wall surface 44 which is straight and which forms an angle with the axis of the seal 10 of preferably about 25° in the as-molded extended condition of the seal 10. The radially outer surface of the intermediate flex wall 26 includes a generally cylindrical surface 46 and a generally radial surface 48 meeting at a crease 50 opposite a point intermediate the ends of the radially inner straight surface 44. The stabilizing wall 24 is relatively thick and preferably has parallel, cylindrical radially inner and outer wall surfaces. It is believed that the crease 50, the surfaces 46 & 48, the thick stabilizing wall 24, and the thicker end of the tapered frusto-conical upper flex and rolling wall 28 are the interacting wall portions or locking points that hold the seal 10 in the collapsed position. The surfaces 46 & 48 appear to lock against each other in the collapsed condition and this appears to be an important factor in the seal 10 holding itself in the collapsed condition.

The lower flex wall 30 has a pair of substantially parallel curving radially inner and outer wall surfaces 54 & 56 respectively such that the thickness of the lower flex wall 30 is substantially uniform throughout its length.

FIG. 3 shows the sealing bead 14 of the upper end of the seal 10 engaging the groove 16 of the piston 18 after the piston has moved axially outwardly and with the seal 10 in its extended condition.

FIG. 4 shows the seal 10 in its convoluted or collapsed condition and shows the piston 18 partially retracted into the cylinder 36. FIG. 4 shows the axially outer end of the cylinder 36 provided with a recess 58 for receiving the sealing end 34 of the seal 10 in the standard manner as will be understood by one skilled in the art.

Figure 5:
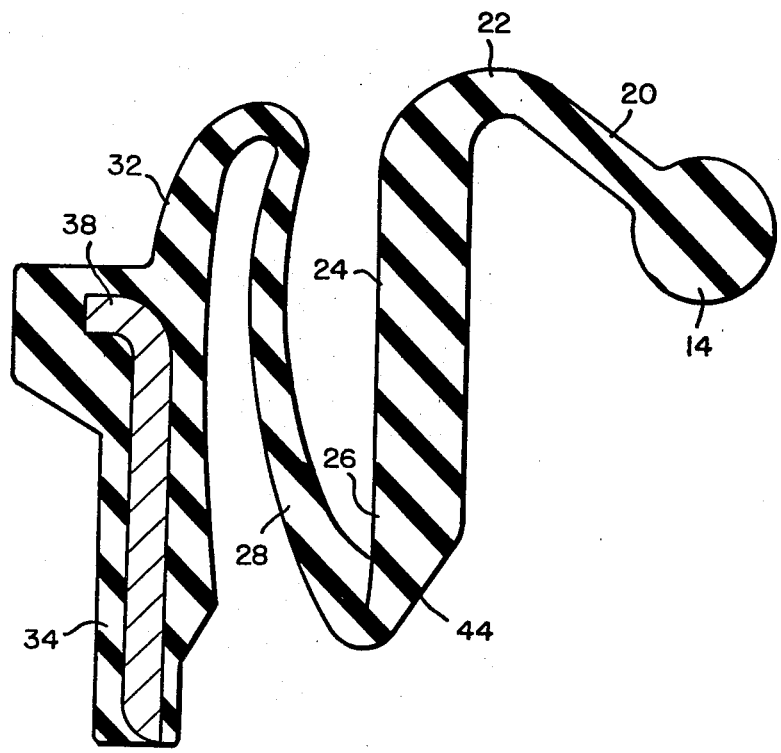
FIG. 5 is an enlarged, partial, cross-sectional view of a boot seal of the present invention in its collapsed condition when not installed in a disc brake assembly.

FIG. 5 shows the seal 10 in its collapsed condition when not installed in a disc brake assembly.

Figure 6:
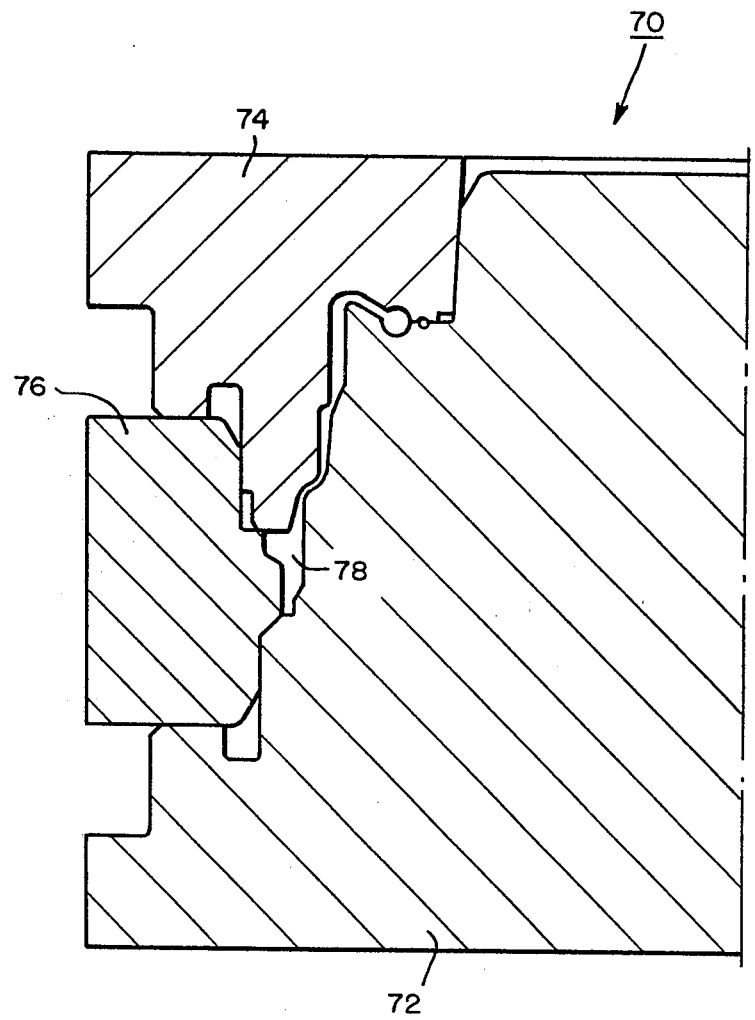
FIG. 6 is a partial, cross-sectional view of a compression mold that can be used to make the seal of the present invention.

FIG. 6 shows a compression mold 70 for use in making the seal 10 according to the present invention. The mold 70 includes a lower piece 72, an upper mold piece 74 and a center mold piece 76 all of which define a mold cavity 78 when the mold is closed. In operation, the metal shell 38 is placed in the mold cavity 78, a preform of synthetic elastomer is also placed in the mold cavity 78, and the lower mold piece 72 and the center mold piece 76 are held stationary while the upper mold piece 74 is forced down causing the elastomer of the preform to flow into the cavity 78 forming the seal 10, as will be understood by those skilled in the art. Other types of molds, such as transfer molds, can be used as will be fully understood by any person skilled in this art.

As the seal 10 moves from its extended condition (FIG. 2) to its collapsed condition (FIG. 5), the sealing end 34 remains substantially unchanged throughout the collapsing process. The stabilizing wall 24 also undergoes very little change, other than the axially inner end thereof distorting slightly during the collapsing process. The collapsing process begins at the lower flex wall 30 as the tapered frusto-conical upper flex and rolling wall 28 rolls back upon itself (inverts) such that in the collapsed condition the thicker end thereof is axially inwardly of the thinner end thereof. Actually, the forces are such that as the rolling wall 28 approaches the completely collapsed condition, the stabilizing wall 24 and the walls axially outward thereof (walls 22 & 20 & bead 14) are caused to quickly move or snap axially inwardly to the completely collapsed condition. This is completely the opposite of the collapsing process of the seal described in the above-mentioned patent application Serial No. 875,765, which seal more strongly resists the force tending to collapse the seal continuously up to the completely collapsed condition, and which seal always and continuously exerts a force tending to and sufficient to return the seal to its extended condition. The holding or locking means in the boot seal 10 of the present invention appears to be the interaction between certain of the wall portions of the sleeve 12, as discussed above, and the relatively thick stabilizing wall 24. In the collapsed condition, the elements axially outward of the crease 50 remain about the same. The small portion of the intermediate flex wall immediately axially inward of the crease 50 bends or rolls over at the crease 50 allowing the wall 28 to invert or flip over approximately 180°.

The invention has been described in detail with particular reference to the preferred embodiments thereof, but it will be understood that variations and modifications can be affected within the spirit and scope of the invention as described hereinafter and as defined in the appended claims.

We claim:

1. A disc brake boot seal for sealing between the bore wall of a cylinder and a piston extending through the bore, comprising:
   (a) an annular, molded, unitary, one-piece flexible, elastomeric sleeve that is collapsible from an extended, as-molded condition to a collapsed convoluted condition and comprising in its extended condition a plurality of different, annular wall portions serially connected together from a piston sealing end at the axially outer end thereof to a cylinder sealing end at the axially inner end thereof, said piston sealing end having a smaller as-molded inner diameter than that of said cylinder sealing end, said wall portions allowing said sleeve to collapse from said extended, as-molded condition to a collapsed condition, and
   (b) at least one of said wall portions including means for interacting with at least one of said wall portions for releasably holding said sleeve in said collapsed condition such that said sleeve does not self extend, and wherein said sleeve includes, in its extended condition, a cylindrical, relatively thick stabilizing wall, an intermediate flex wall located immediately axially inwardly of said stabilizing wall, thereby being located closer to said cylinder sealing end than is said stabilizing wall, said flex wall being connected to one end of said stabilizing wall and tapering radially outwardly from said one end of said stabilizing wall, and a tapered frusto-conical upper flex and rolling wall immediately axially inwardly of and connected to said flex wall and having an inside diameter greater than that of said stabilizing wall, said flex wall including an annular crease on its radially outer surface and said upper flex and rolling wall being invertable about said crease, such that said upper flex and rolling wall inverts and moves from its position in the extended sleeve wherein it extends axially inwardly from said crease to an inverted position in the collapsed sleeve wherein it extends axially outwardly from said crease as said sleeve is moved from its extended to its collapsed condition.

2. The article according to claim 1 wherein said intermediate flex wall has a tapered radially inner surface which is substantially straight, which forms an acute angle with the axis of said seal and which tapers from a smaller to a larger diameter in the axially inward direction when said sleeve is in its extended condition.

3. The article according to claim 2 wherein said acute angle is approximately 25°.

4. The article according to claim 1 wherein the radially outer surface of said intermediate flex wall includes, when said sleeve is in its extended condition, an axially outer generally cylindrical surface and a generally radial surface located axially inwardly from said generally cylindrical surface, said outer and inner surfaces meeting at an annular crease.

5. The article according to claim 4 wherein said intermediate flex wall has a tapered radially inner surface which is substantially straight, which forms an acute angle with the axis of said seal and which tapers from a smaller to a larger diameter in the axially inward direction when said sleeve is in its extended condition.

6. The article according to claim 5 wherein said acute angle is approximately 25°.

7. The article according to claim 6 wherein said tapered frusto-conical upper flex and rolling wall tapers from a narrow thickness to a greater thickness in the axially outward direction when said sleeve is in its extended condition and wherein said tapered frusto-conical upper flex and rolling wall has a radially outer surface extending substantially axially.

8. The article according to claim 7 wherein said stabilizing wall is substantially cylindrical.

9. The article according to claim 8 wherein said stabilizing wall has a substantially uniform thickness throughout its length and wherein said thickness is substantially greater than that of said upper boot wall and of said lower flex wall.

10. A disc brake boot seal for sealing between the bore wall of a cylinder and a piston extending through the bore, comprising:
    (a) an annular, molded, unitary, one-piece, flexible, elastomeric sleeve that is collapsible from an extended, as-molded, condition to a collapsed convoluted condition, said sleeve having a sealing bead portion at one end thereof and a cylinder sealing portion at the other end thereof, said bead portion having a smaller as-molded inner diameter than that of said cylinder sealing portion, said sleeve comprising nine distinct annular wall portions of a plurality of different thicknesses serially connected together and comprising in order from said bead portion:
       (1) said sealing bead adapted to elastically fit into an annular recess of a piston;
       (2) an upper boot wall;
       (3) an upper flex wall;
       (4) a stabilizing wall;
       (5) an intermediate flex wall;
       (6) a tapered frusto-conical upper flex and rolling wall;
       (7) a lower flex wall;
       (8) a tapered frusto-conical lower flex and rolling wall;
       (9) a sealing end adapted to be connected to a cylinder; and
    (b) wherein at least one of said wall portions includes means for interacting with at least one of said wall portions for releasably holding said sleeve in its collapsed condition such that it does not self-extend.

11. The article according to claim 10 wherein said intermediate flex wall has a tapered radially inner surface which is substantially straight, which forms an acute angle with the axis of said seal and which tapers from a smaller to a larger diameter in the axially inward direction when said sleeve is in its extended condition.

12. The article according to claim 11 wherein said acute angle is approximately 25°.

13. The article according to claim 10 wherein the radially outer surface of said intermediate flex wall includes, when said sleeve is in its extended condition, an axially outer generally cylindrical surface and an axially inner generally radial surface, said cylindrical and radial surfaces meeting at an annular crease.

14. The article according to claim 13 wherein said intermediate flex wall has a tapered radially inner surface which is substantially straight, which forms an acute angle with the axis of said seal, and which tapers from a smaller to a larger diameter in the axially inward direction when said sleeve is in its extended condition.

15. The article according to claim 14 wherein said acute angle is approximately 25°.

16. The article according to claim 15 wherein said tapered frusto-conical upper flex and rolling wall tapers from a narrow thickness to a greater thickness in the axially outward direction when said sleeve is in its extended condition and wherein said tapered frusto-conical upper flex and rolling wall has a radially outer surface extending substantially axially.

17. The article according to claim 16 wherein said stabilizing wall is substantially cylindrical.

18. The article according to claim 17 wherein said stabilizing wall has a substantially uniform thickness throughout its length and wherein said thickness is substantially greater than that of said upper boot wall and of said lower flex wall.

19. The article according to claim 10 wherein said tapered frusto-conical upper flex and rolling wall tapers from a narrow thickness to a greater thickness in the axially outward direction when said sleeve is in its extended condition.

20. The article according to claim 10 wherein said stabilizing wall is substantially cylindrical.

21. The article according to claim 20 wherein said stabilizing wall has a substantially uniform thickness throughout its length and wherein said thickness is substantially greater than that of said upper boot wall and of said lower flex wall.

22. The article according to claim 10 wherein said tapered frusto-conical lower flex and rolling wall tapers from a narrow to a greater thickness in the axially inward direction when said sleeve is in its extended condition.

23. The article according to claim 10 wherein said lower flex wall includes a curving radially outer surface and a substantially parallel curving radially inner surface and wherein said lower flex wall curves from a larger diameter to a smaller diameter in the axially outer direction when said sleeve is in its extended condition.

24. The article according to claim 10 wherein said tapered frusto-conical upper flex and rolling wall has a radially outer surface extending substantially axially.

25. The article according to claim 10 wherein said tapered frusto-conical lower flex and rolling wall has a radially inner surface extending substantially axially.

26. The article according to claim 10 wherein said upper boot wall, in its as-molded condition, forms an acute angle with said stabilizing wall.

27. The article according to claim 10 wherein said seal includes an annular metal shell bonded to said sealing end.

28. The article according to claim 27 wherein said shell includes a cylindrical portion and a radial flange extending radially outwardly from the axially outer end of said cylindrical portion.

29. A method for assembling a disc brake system including a piston, a cylinder, and a disc brake boot seal for sealing the annular space between the piston and cylinder, comprising the steps of:
   (a) molding in its extended condition, an annular, unitary, one-piece, flexible, elastomeric sleeve that is collapsible from an extended as-molded, condition to a collapsed convoluted condition and that includes a plurality of different, annular wall portions serially connected together from a piston sealing end at one end thereof to a cylinder sealing end at the other end thereof, at least one of said wall portions having means for interacting with at least one of said wall portions for releasably holding the sleeve in its collapsed condition such that it does not self-extend;
   (b) installing said sleeve in said cylinder of said disc brake system;
   (c) collapsing said sleeve into its collapsed convoluted condition, and
   (d) then installing a piston in said cylinder while said sleeve is in its collapsed condition wherein said collapsed sleeve is maintained in its collapsed condition without any external forces acting on said sleeve to maintain its collapsed condition, and attaching said piston sealing end to said piston.

30. The method according to claim 29 wherein said molding step comprises molding said sleeve with the following annular wall portions serially connected together starting at a piston sealing end thereof:
   (1) a sealing bead adapted to elastically fit into an annular recess of a piston;
   (2) an upper boot wall;
   (3) an upper flex wall;
   (4) a stabilizing wall;
   (5) an intermediate flex wall;
   (6) a tapered frusto-conical upper flex and rolling wall;
   (7) a lower flex wall; and
   (8) a tapered frusto-conical lower flex and rolling wall; and
   (9) a sealing end adapted to be connected to a cylinder.

31. The method according to claim 29 wherein said molding step comprises molding said sleeve with a relatively thin flex wall having a crease on its radially outside surface and providing a relatively thick stabilizing wall connected to said flex wall axially outside of said crease and providing a rolling wall connected to said flex wall axially inside of said crease and forming said rolling wall with a tapered thickness from a greater thickness adjacent said flex wall to a narrower thickness remote from said flex wall, and inverting said rolling wall such that it moves from axially inside to axially outside of said crease when said sleeve is collapsed, whereby said rolling wall, crease, and stabilizing wall hold said sleeve in its collapsed condition.

32. The method according to claim 31 wherein said sleeve installing step comprises installing said sleeve in said cylinder of said disc brake system while said sleeve is in its collapsed condition.

33. The method according to claim 31 wherein said sleeve installing step comprises collapsing said sleeve and then installing said sleeve in its collapsed condition.

* * * * *